Patented Feb. 26, 1952

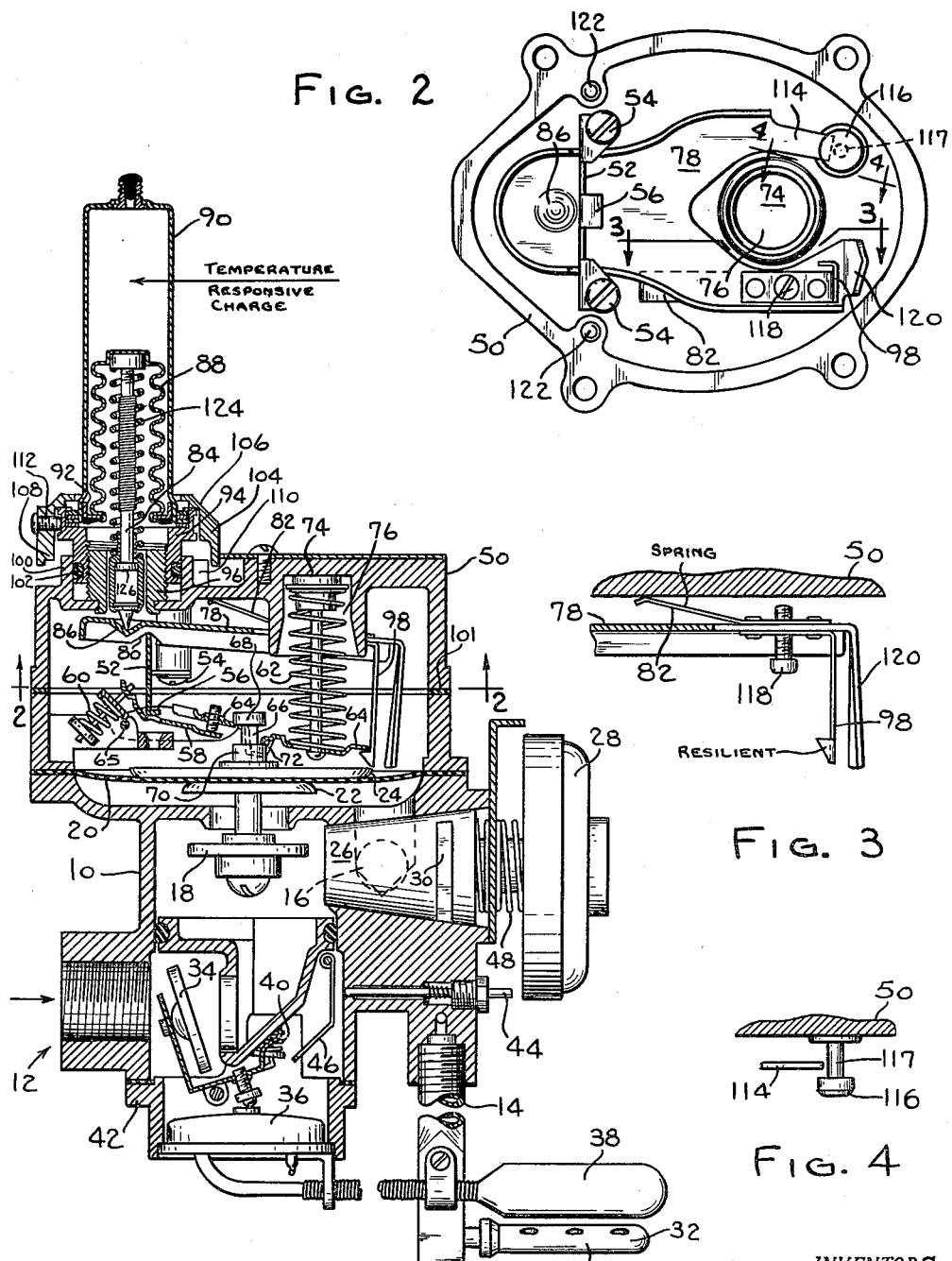

2,587,480

UNITED STATES PATENT OFFICE 2,587,480

GAS CONTROL VALVE

Roy W. Johnson and Ferdinand F. Heiser, Milwaukee, Wis., assignors to A P Controls Corporation, a corporation of Wisconsin Application October 20, 1950, Serial No. 191,281

6 Claims. (Cl. 236—92)

This invention relates to a thermostatically regulated gas control valve and to the conversion unit employed in converting a manually controlled valve to thermostatic regulation.

The co-pending Johnson et al. application Serial No. 160,268 discloses a manual gas control which may be modified, by the addition of various conversion units, to a manual control provided with a "safety pilot" valve and to a fully automatic gas valve including the safety pilot control, a pressure regulator and means for regulating flow through the valve in accordance with temperature at a remote position where a room thermostat is located. The present unit is adapted for use with the basic manual control valve disclosed in said application to convert the valve to thermostatic regulation by mechanical means responsive to ambient temperature. Since the converted unit is responsive to ambient temperature it will readily be appreciated that this device is pretty well limited to use with space heaters.

An object of this invention is to provide a unit for converting a manually operated control valve to thermostatic regulation in accordance with ambient temperature.

Another object is to provide a simple, reliable and readily adjusted temperature responsive device for regulating gas flow and which is capable of modulating the flow between the limits.

A further object is to provide a readily adjusted mechanical thermostat for a gas control valve which modulates the gas flow rather than operating on an "on-off" cycle.

Other objects and advantages will be pointed out in, or be apparent from, the specification and claims, as will obvious modifications of the single embodiment shown in the drawings, in which:

Fig. 1 shows the conversion top mounted on the gas control valve disclosed in said Johnson et al. application;

Fig. 2 is a bottom view of the conversion top; and

Figs. 3 and 4 are fragmentary cross sections taken as indicated on Fig. 2.

Referring to the drawings in detail, the control valve comprises a body 10 having an inlet 12, a pilot burner outlet 14, and a main burner outlet 16. Valve 18 carried by diaphragm 20 is adapted to regulate the outlet pressure which acts on the bottom of diaphragm 20 and is opposed by spring 62 and the weight of the valve and metal plates 22, 24 carried on either side of diaphragm 20. Flow from the chamber on the outlet side of valve 18 to the main burner is regulated by plug valve 26 actuated by knob 28. When plug valve 26 is in the position shown in Fig. 1, flow to the main burner passes through the plug valve to outlet 16 at the regulated pressure. Flow to the pilot burner by-passes the pressure regulator valve and flows axially through the plug valve into peripheral groove 30 which is connected to pilot burner 32 by outlet 14 and suitable conduits. Flow to the main burner may be cut off entirely by plug valve 26 while flow to the pilot burner is maintained. Further details of this structure may be seen in said Johnson et al. application and are not considered important with respect to the present invention.

When it is desired to convert the valve to automatic operation in response to thermostatic demand for heat as shown in said Johnson et al. application or when converting to automatic operation by means of the present device, it is preferable to provide the control with a safety pilot valve 34 which is held open by diaphragm 36 when charged feeler bulb 38 is heated by the pilot flame. If the pilot burner should be extinguished, bulb 38 cools and diaphragm 36 collapses to allow spring 40 to return valve 34 to its seat and cut off flow to the main and pilot burners. It may be noted that the safety valve 34 is carried by a sub-assembly 42 which may be inserted into the inlet chamber as shown. Upon properly positioning knob 28, the knob may be moved to the left to push pin 44 inwardly and cock arm 46 to open valve 34 and establish flow to the pilot burner to permit ignition of the pilot. Upon release of knob 28 spring 48 moves the knob outwardly to permit pin 44 to return to its normal position and allow safety valve 34 to close in absence of the flame at the pilot burner.

The present conversion top is adapted to be mounted on top of the valve body 10 above diaphragm 20 to regulate movement of the pressure regulating valve 18. The conversion top includes a housing 50 provided with a fulcrum support 52 removably mounted therein by screws 54, 54. The fulcrum support includes a depending arm 56 which acts on lever 58 in opposition to spring 60 to render the spring 60 inoperative at all times. Spring 60 does not have any function when the present conversion top is used and is employed only when the electric thermostatic conversion top is utilized. Rendering spring 60 inoperative permits compressed spring 62 to bias lever 64, pivoted on pin 65, to its lower position wherein valve 18 opens to its maximum and regulates the pressure by virtue of the freedom of movement between the valve stem 66 and lever 64 obtained by means of the spaced shoulders 68, 70 on the stem and engaging with lug 72 on lever 64. Spring 62 is carried by lever 64 and compressed between the lever and the seat 74 in well 76 cast in housing 50.

With lever 64 in the position shown it will be appreciated that if the pressure on the underside of diaphragm 20 decreases, the weight of pads 22, 24 will cause the valve 18 to open further up to the limit determined by contact between lug 72 and the upper valve stem shoulder 68. If lever 64 is moved upwardly to some position short of that in which valve 18 is closed, valve 18 will pass less fuel but will have freedom of movement to regulate pressure. It will be appreciated that when the lever 64 is thus actuated to control the amount of fuel passed by valve 18, the plug valve 26 must be in its open position so that fuel flow is entirely regulated by valve 18.

Lever 78 is mounted on fulcrum 52 at notch 80 and is biased clockwise by a leaf spring 82. Push pin 84 bears on lever detent 86 to transmit movement of bellows 88 to the lever as the bellows is flexed in accordance with ambient temperatures as felt by the temperature responsive charge in bulb 90. The bulb and bellows are hermetically sealed by means of solder 92 and are carried by an annular member 94 threadably mounted on stud 96 through which pin 84 passes. When the temperature increases in bulb 90 the charge pressure increases to collapse bellows 88 and move pin 84 downwardly, thus raising resilient latch 98 depending from the lever 78 and engaging the tip of lever 64 which is raised to decrease the flow past control valve 18. As the bulb cools, the pressure decreases, bellows 88 expands and permits springs 82 and 62 to move lever 78 downwardly to increase the fuel flow.

Resilient latch 98 serves not only to connect levers 78 and 64 but permits rapid and simple mounting of the conversion top on the manual control valve. Thus, the latch 98 will be cammed to the right by engagement with the tip of the lever 64 so the tip of the latch can snap under the tip of the lever 64. With this arrangement the locating pins 122 on the bottom of the housing can be employed to insure positive location and to permit the top to be moved straight down on to the valve when assembling the controls.

The completed unit is made gas tight with a gasket 101 between housing 50 and valve body 10, an O-ring seal 102 between rotatable member 94 and the inner wall of well 100, and gaskets between the bulb and member 94.

The threaded member 94 may be turned on stud 96 to pre-position the bellows 88 above lever 78 and thus vary the response temperature of the conversion top. An annular collar 104 may be mounted on member 94 by means of set screw 112. Collar face 106 is provided with suitable indicia which cooperate with a stationary pointer on the name plate to indicate the temperature setting of the control. The underside of collar 104 is provided with a land 108 which cooperates with lug 110 cast on the head of body 50 to limit the adjustment range or rotation of the bulb and to prevent removal of the power element. Should removal be necessary for repair or adjustment purposes, member 94 can be freed for greater movement by removing collar 104.

The operation of this device is as follows: after establishing flow to the pilot burner as set forth above and as more fully set forth in the Johnson et al. application, the plug valve 26 is rotated to the full open position to place the valve under control of bulb 90. Bulb 90 responds to ambient temperature to flex bellows 88 and actuate lever 78 to position lever 64 where valve 18 will pass the desired quantity of fuel. Since bulb 90 responds to ambient temperature and does not operate on an "on-off" system, it will be appreciated that valve 18 will be modulated between the upper and lower limits and will tend to position where the burner output substantially matches the heat loss from the heated space. Valve 18 regulates the pressure at the outlet in addition to regulating the quantity of flow through the control valve.

It will be noted in Fig. 2 that lever 78 is bifurcated to straddle the spring well with one end 114 projecting between the top of housing 50 and head 116 on depending pin 117. Contact between arm 114 and head 116 determines the lower limit of lever movement and, therefore, the maximum valve opening. Screw 118, threaded through the operating arm of lever 78, may be adjusted to limit the upward movement of lever 78 and prevent closing the valve. It will also be noted that the operating arm of lever 78 is provided with a depending stiff member 120 which serves to protect the relatively weak resilient latch 98. Should some abnormal temperature be encountered which tends to move lever 78 beyond its upper limit, rupture of the bellows is prevented by means of an over-travel mechanism in pin 84. This mechanism permits compression of stiff spring 124 to allow plunger 126 to move into the head of the pin. Normally, however, spring 124 keeps the parts extended to act as a solid pin.

It is also of interest to note the manner in which pin 84 and spring 82 cooperate to hold lever 78 seated on the fulcrum. This simple construction facilitates assembly and eliminates the need for pivot pins and the like.

Although but one embodiment of the present invention has been illustrated and described, it will be apparent to those skilled in the art that various changes and modifications may be made therein without departing from the spirit of the invention or from the scope of the appended claims.

We claim:

1. A device for use with a gas control including a pressure regulating valve movable with respect to a valve lever which may be positioned to determine the operating range of the valve and consequently the amount of fuel passed by the valve, comprising, a casing adapted for connection to said control and including a spring seat adapted to receive a spring compressed between the seat and said lever to bias said valve lever in the valve opening direction, a control lever fulcrumed in said casing, a latch depending from said control lever and formed to engage said valve lever, said latch being resilient to permit movement away from the end of the valve lever when mounting the casing on the control, and means for actuating said control lever in accordance with ambient temperature to regulate the position of the valve lever.

2. The device set forth in claim 1 in which said means comprises a bulb projecting from said housing and including a bellows, a charge in said bulb responsive to ambient temperature to vary the pressure in the bulb and flex the bellows, and means connecting said bellows to said control lever to position the control lever in accordance with ambient temperature.

3. A device as set forth in claim 1 in which the bulb is threadably mounted on the housing to permit adjustment of the position of said control lever at a given temperature by varying the distance between the bellows and the control lever.

4. A conversion top adapted for use with a gas control provided with a valve lever having a lost motion connection with a pressure regulating valve and positionable to regulate the rate of flow through the valve casing, comprising, a housing adapted for connection to the control and provided with a fulcrum support, a control lever fulcrumed on said support, a latch depending from said control lever and adapted to engage said valve lever, a spring biasing said control lever in the valve opening direction, a power element mounted on and projecting from said housing and including a bellows, a temperature responsive charge in said power element to flex the bellows as the temperature varies, means connecting said bellows to the control lever to move the control lever in the valve closing direction as the bellows flexes with increasing temperature, said spring moving the control lever in the valve opening direction as the temperature decreases.

5. A conversion top according to claim 4 in which the power element is threadably mounted on the housing so the element may be rotated to vary the distance between the bellows and the control lever to adjust the control lever position at a given temperature.

6. A conversion top according to claim 5 in which the latch is resilient to allow movement of the latch away from the valve lever during assembly of the housing on the control.

ROY W. JOHNSON.
FERDINAND F. HEISER.

REFERENCES CITED

The following references are of record in the file of this patent:

UNITED STATES PATENTS

| Number | Name | Date |
|---|---|---|
| 1,800,280 | Branche | Apr. 14, 1931 |
| 1,917,893 | Mancib | July 11, 1933 |
| 2,243,934 | Whitney | June 3, 1941 |
| 2,416,453 | Mather et al. | Feb. 25, 1947 |